Figure 1:
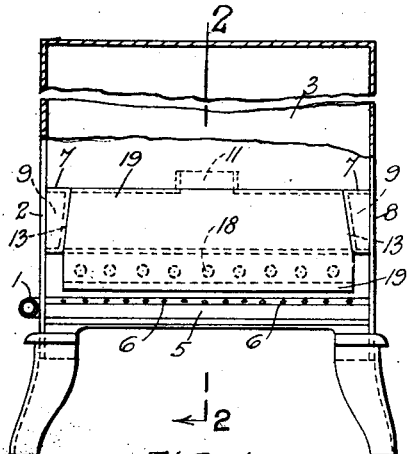

Dec. 13, 1927.

A. A. SCOTT ET AL 1,652,737

GAS COOKING AND HEATING OVEN

Filed June 7, 1927

Inventor:
Ethel May Scott, Deceased,
Annie A. Scott,
Earnest H. Scott,
Percy R. Scott,
John W. MacDonald, Administrator.

By B. Singer, Atty.

Patented Dec. 13, 1927.

1,652,737

UNITED STATES PATENT OFFICE.

ANNIE ALICE SCOTT, EARNEST HERBERT SCOTT, AND PERCY RANDALL SCOTT, OF CHRISTCHURCH, AND ETHEL MAY SCOTT, DECEASED, LATE OF CHRISTCHURCH, NEW ZEALAND, BY JOHN WILLIAM MACDONALD, ADMINISTRATOR, OF WELLINGTON, NEW ZEALAND; SAID MACDONALD ASSIGNOR TO SAID ANNIE ALICE SCOTT, EARNEST HERBERT SCOTT, AND PERCY RANDALL SCOTT.

GAS COOKING AND HEATING OVEN.

Application filed June 7, 1927, Serial No. 197,168, and in New Zealand May 18, 1926.

This invention relates to gas cooking and/or heating ovens and has for its objects to provide an oven wherein there is more perfect combustion of the gases and more effective ventilation than is the case where a baffle bar or plate is provided at a distance from the lower side of the burner tube, thereby forming with the adjacent lower portion of the burner tube a passage for secondary air for combustion.

According to this invention we provide a suitably located and shaped directory baffle plate above the burner, which plate through becoming heated from the burner below, warms a portion of the incoming air,—supplied through suitably disposed openings in the back of the oven—as it passes between the lower edge of the baffle and the burner, and thus said air being directed by said baffle plate on to the burner in a warm or heated condition enables combustion to take place readily and consequently more intense heat to be emitted.

Furthermore as pure air is drawn direct from the outside of the oven to the point of combustion, the possibility of drawing foul air, that is to say, air charged with fumes from the articles being baked or roasted, from the bottom of the oven to the burner is minimized. The baffle plate is curved and of such a shape that it takes up a certain amount of heat from the flame without appreciably affecting the heating of the upper part of the oven and furthermore its shape and disposition assists in directing the heat to the front of the oven and facilitates the even distribution of heat in the bottom as well as the top thereof.

The novel and improved method and means of ventilating the bottom of the oven and of carrying away impure or foul air comprise the provision of suitably disposed ventilating flues constructed inside and at each side of the oven, and outlet being provided from each side flue to a flue at the back of the oven said back flue having an outlet at the top thereof. While the side flues are preferably placed within the oven it will be obvious that they may be placed on the outside of the oven without departing from the principle of permitting the foul air and gases to escape into the side flues and at the same time assisting in the drawing in of the secondary fresh air for the burner, which assists in causing the heated air in the oven to rise. Said side flues are provided with a plurality of intake holes the size and number of which obviously will depend on the size of the oven. Said holes are preferably placed nearer the front of the oven than the back to permit of a more even distribution of heat therein. Means such as a sliding shutter are provided to regulate the draught through these holes to meet the cooking requirements of the oven and the supply of secondary air to the burner, it being obvious that when said shutter is closed the circulation of the air in the oven practically ceases.

When a sliding shutter is used as the regulating means, it has the further advantage of enabling the oven to retain its heat for some time.

Figure 2:
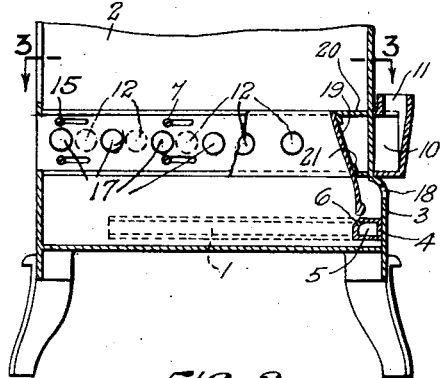
Figure 3:
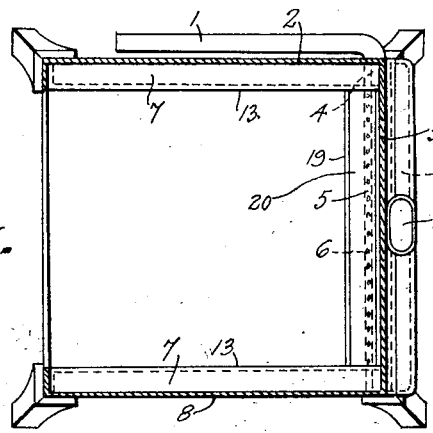
Figure 6:
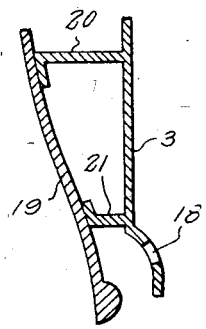
Figures 4, 5:
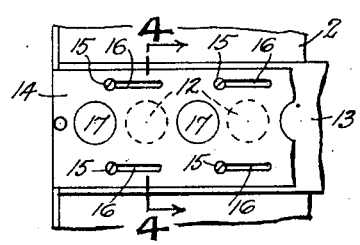

Referring now to the accompanying drawings which illustrate a constructional embodiment of the invention, Figure 1 is a part front elevation of a gas cooking or heating oven constructed according to this invention with the door removed. Figure 2 is a part side sectional elevation of the oven through line 2—2 of Figure 1, Figure 3 is a sectional plan of the oven through line 3—3 of Figure 2, Figure 4 is a cross section through line 4—4 of Figure 5 showing one of the side ventilating flues, while Figure 5 is a part inside elevation of one of the side walls of the oven and ventilating flues shewing part of the sliding shutter attached to the flue. Figure 6 is a detail section of the baffle and adjacent parts of the oven.

The usual gas inlet pipe 1 is led along the outside of the wall 2 towards the back plate 3 of the oven, the pipe 1 being inserted through a hole 4 in the plate 2, to allow the end 5 preferably rectangular in shape as shewn in the drawings and provided with the usual burner holes 6 to pass along practically right up against the inner face of the back plate 3 to minimize the possibility of secondary air creeping up from the bottom of the oven.

A series of holes 18 is provided across the back plate 3 and between the two side flues 7 to admit a secondary supply of air to the oven burner, and after combustion takes place, the baffle plate 19, curved and of such a shape that it directs the heat to the front of the oven and assists in distributing the heat evenly in the oven, is provided thereacross immediately in front of the holes 18 and above the burner pipe 5. This baffle plate 19 is supported by two horizontally flanged extensions 20 and 21 which may be integral with back plate 3 or otherwise secured thereto, and are suitably secured to baffle plate 19 as for instance by bolts. Both flanged extensions 20 and 21 extend right across the oven between the side flues 7 and the lower flange 21 assists in the downward deflection of the incoming secondary air through apertures 18 and directs same on to top of burner 6. The baffle plate 19 becomes heated by the gas jets and directs the secondary air supply, partially heated, through the back of the baffle plate 19 to the oven burner.

Ventilating flues 7, either integral with, or attached to, the sides 2 and 8 of the oven, are designed to discharge the impure or foul air through holes 9 in the back plate 3 into the flue 10 placed across the rear of the back plate 3. The flue 10 is provided with a preferably centrally disposed air outlet 11 in its upper face. Holes 12 are provided in the inner faces of the flues 7 to provide egress of the foul air from the oven, preferably nearer the front of the oven to ensure a more even distribution of the heat.

Each of the side flues 7 is provided with a sliding shutter 14 for the purpose of regulating the draught in the oven. The shutters 14 may be slidably attached either inside or outside the face 13 of the flues 7 by means such as screws 15 tapped into the faces 13 and slots 16 in the shutters 14. Holes 17 are provided in the shutters 14 to correspond in size and position with the holes 12 in the faces 13 of the flue 7. In Figure 5 the shutter 14 is shown blanking the holes 12, and thereby stopping air circulation in the oven.

We claim:

1. A gas oven having a wall provided with secondary air intake openings, a burner extending along said wall on its inner side at a point below said openings, a transverse flue on the outer side of said wall above said openings and having a discharge opening, flues in opposite sides of the oven leading to said transverse flue and having openings for the discharge of impure air from the oven and a baffle spaced from the first named wall, extending above said burner to cause secondary air to be drawn downwardly to the burner and to pass between the same and the lower side of the baffle into the oven, said baffle extending continuously across the oven to the said side flues.

2. A gas oven having a wall provided with secondary air intake openings, a burner extending along said wall on its inner side at a point below said openings, a transverse flue on the outer side of said wall above said openings and having a discharge opening, flues in opposite sides of the oven leading to said transverse flue and having openings for the discharge of impure air from the oven and a baffle spaced from the first named wall, extending above said burner to cause secondary air to be drawn downwardly to the burner and to pass between the same and the lower side of the baffle into the oven, said baffle extending continuously across the oven to the said side flues, said side flues being each provided with a damper plate having openings and movable to cause its openings to move into or out of registry with those of said side flues.

In testimony whereof we affix our signatures.

ANNIE ALICE SCOTT.
EARNEST HERBERT SCOTT.
PERCY RANDALL SCOTT.
J. W. MACDONALD,
*Administrator of the Estate of Ethel May Scott, deceased.*